United States Patent
Bober

(10) Patent No.: US 7,613,342 B1
(45) Date of Patent: Nov. 3, 2009

(54) METHOD AND DEVICE FOR DISPLAYING OR SEARCHING FOR OBJECT IN IMAGE AND COMPUTER-READABLE STORAGE MEDIUM

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 576 days.

(21) Appl. No.: 09/786,352

(22) PCT Filed: Jul. 12, 2000

(86) PCT No.: PCT/JP00/04673
§ 371 (c)(1), (2), (4) Date: Mar. 13, 2001

(87) PCT Pub. No.: WO01/06457
PCT Pub. Date: Jan. 25, 2001

(30) Foreign Application Priority Data

Jul. 15, 1999 (GB) .................................. 9916684.5

(51) Int. Cl.
*G06K 9/46* (2006.01)

(52) U.S. Cl. ................... 382/203; 348/143; 348/169; 382/103; 382/224; 382/264; 707/6; 707/E17.024

(58) Field of Classification Search ............... 382/170, 382/199, 203, 218, 236, 242, 261, 266, 181, 382/103, 195, 224, 264; 707/102, 6, E17.024; 348/143, 169
See application file for complete search history.

(56) References Cited

U.S. PATENT DOCUMENTS

| | | | | |
|---|---|---|---|---|
| 5,231,677 A * | 7/1993 | Mita et al. | ................... | 382/266 |
| 5,504,318 A * | 4/1996 | Joseph et al. | ............... | 235/454 |
| 5,537,494 A * | 7/1996 | Toh | ........................... | 382/242 |
| 5,615,324 A * | 3/1997 | Kuboyama | ................... | 345/441 |
| 5,642,166 A * | 6/1997 | Shin et al. | ............. | 375/240.15 |
| 5,751,853 A * | 5/1998 | Michael | ...................... | 382/203 |
| 5,974,175 A * | 10/1999 | Suzuki | ....................... | 382/199 |
| 6,005,978 A * | 12/1999 | Garakani | .................... | 382/218 |
| 6,014,461 A * | 1/2000 | Hennessey et al. | .......... | 382/195 |
| 6,029,173 A * | 2/2000 | Meek et al. | ................. | 707/102 |
| 6,055,340 A * | 4/2000 | Nagao | ........................ | 382/261 |
| 6,061,151 A * | 5/2000 | Ono | ........................... | 358/448 |
| 6,137,913 A * | 10/2000 | Kwak et al. | ................. | 382/236 |
| 6,256,409 B1 * | 7/2001 | Wang | .......................... | 382/170 |
| 6,269,358 B1 * | 7/2001 | Hirata | ............................ | 707/1 |
| 6,307,964 B1 * | 10/2001 | Lin et al. | .................... | 382/203 |
| 6,400,846 B1 * | 6/2002 | Lin et al. | .................... | 382/199 |

(Continued)

FOREIGN PATENT DOCUMENTS

GB     2 246 230     1/1992

(Continued)

OTHER PUBLICATIONS

U.S. Appl. No. 09/763,852, filed Feb. 28, 2001, pending.

(Continued)

*Primary Examiner*—Gregory M Desire
(74) *Attorney, Agent, or Firm*—Birch, Stewart, Kolasch & Birch, LLP.

(57) ABSTRACT

A method of representing an object appearing in a still or video image, by processing signals corresponding to the image, comprises deriving a curvature scale space (CSS) representation of the object outline by smoothing the object outline, deriving at least one additional parameter reflecting the shape or mass distribution of a smoothed version of the original curve, and associating the CSS representation and the additional parameter as a shape descriptor of the object.

21 Claims, 2 Drawing Sheets

U.S. PATENT DOCUMENTS

| | | | | |
|---|---|---|---|---|
| 6,424,746 | B1 * | 7/2002 | Nishida | 382/195 |
| 6,678,413 | B1 * | 1/2004 | Liang et al. | 382/181 |
| 6,931,154 | B1 * | 8/2005 | Bober | 382/203 |
| 6,965,688 | B2 * | 11/2005 | Shimamura et al. | 382/154 |
| 7,068,842 | B2 * | 6/2006 | Liang et al. | 382/181 |
| 2005/0256399 | A1 * | 11/2005 | Sirohey et al. | 600/425 |
| 2005/0276443 | A1 * | 12/2005 | Slamani et al. | 382/103 |
| 2008/0253654 | A1 * | 10/2008 | Delong | 382/173 |

FOREIGN PATENT DOCUMENTS

| | | | |
|---|---|---|---|
| GB | 2352076 A | * | 1/2001 |
| JP | 6-309465 | | 11/1994 |
| JP | 10-55447 | | 2/1998 |

OTHER PUBLICATIONS

U.S. Appl. No. 09/786,161, filed Mar. 2, 2001, pending.

U.S. Appl. No. 09/786,352, filed Mar. 13, 2001, pending.

F. Mokhtarian, et al., Lecture Notes in Computer Science, vol. 1311, pp. 140-147, "A New Approach to Computation of Curvature Scale Space Image for Shape Similarity Retrievel", 1997.

S. Abbasi, et al., Lecture Notes in Computer Science, vol. 1252, pp. 284-295, "Reliable Classification of Chrysanthemum Leaves Through Curvature Scale Space", 1997.

S. Abbasi, et al., Challenge of Image Retrieval, pp. 1-10, "Robustness of Shape Similarity Retrieval Under Affine Transformation", 1999.

G. Bebis, et al., Pattern Recognition, vol. 32, No. 7, pp. 1175-1201, "Curvature Scale-Space-Driven Object Recognition With an Indexing Scheme Based on Artificial Neutral Networks", Jul. 1999.

Farzin Mokhtarian, Sadegh Abbasi and Josef Kittler, "*Robust and Efficient Shape Indexing through Curvature Scale Space,*" Proc. British Machine Vision Conference, pp. 53-62, Edinburgh, UK, 1996.

Farzin Mokhtarian, Sadegh Abbasi and Josef Kittler, "*Indexing and Image Database by Shape Content Using Curvature Scale Space,*" Proc. IEE Colloquium on Intelligent Databases, London, 1996.

F. Mokhtarian, "Silhouette-based occluded object recognition through curvature scale space," Machine Vision and Applications (1997), pp. 87-97.

David Yuk-Ming Chan and Irwin King, "Genetic Algorithm for Weights Assignment in Dissimilarity Funtion for Trademark Retrieval," VISUAL 1999: 557-565.

* cited by examiner

METHOD AND DEVICE FOR DISPLAYING OR SEARCHING FOR OBJECT IN IMAGE AND COMPUTER-READABLE STORAGE MEDIUM

TECHNICAL FIELD

The present invention relates to the representation of an object appearing in a still or video image, such as an image stored in a multimedia database, especially for searching purposes, and to a method and apparatus for searching for an object using such a representation.

BACKGROUND ART

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-62, Edinburgh, UK, 1996 and "Indexing an Image Database by Shape Content using Curvature Scale Space" Proc. IEEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, specifically, the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

It is also known from the first-mentioned paper above to use two additional parameters, circularity and eccentricity of the original shape, to reject from the matching process shapes with significantly different circularity and eccentricity parameters.

A problem with the representation as described above is that retrieval accuracy is sometimes poor, especially for curves which have a small number of concavities or convexities. In particular, the representation cannot distinguish between various convex curves.

An aspect of the present invention is to introduce an additional means of describing the shape of the "prototype contour shape". The prototype contour shape is defined here preferably as:

1) The original shape if there are no convexities or concavities in the contour (i.e. there are no peaks in the CSS image), or 2) The contour of the shape after smoothing equivalent to the highest peak in the CSS image.

Note, that the prototype contour shape is always convex.

For example, the shape of the prototype contour can be described by means of the invariants based on region moments as described in the paper "Visual Pattern Recognition by Moments Invariants", IEEE Transaction on Information Theory, Vol. IT-8, 179-187, 1962 by M. K. Hu the contents of which are incorporated herein by reference or using the Fourier descriptors as described in the paper "On Image Analysis by the Methods of Moments", IEEE Transactions on Pattern Analysis and Machine Intelligence, Vol. 10, No. 4, July 1988, by Cho-Huak The, the contents of which are incorporated herein by reference, or parameters such as eccentricity, circularity, etc. In the known method mentioned above, eccentricity and circularity is only used in relation to the original shape. Here we use it in relation to a "prototype shape", which is different for curves which have at least one CSS peak. Another difference is that in the known method eccentricity and circularity are used to reject certain shapes from the similarity matching, and here we use them (in addition to CSS peaks) to derive the value of the similarity measure. Finally, we extend the additional parameters used in the matching process to the moment invariants, Fourier descriptors and Zernike Moments.

As a result of the invention, the retrieval accuracy can be improved.

DISCLOSURE OF INVENTION

A method of representing an object appearing in a still or video image, by processing signals corresponding to the image is described herein. According to an embodiment, the method comprises deriving a curvature scale space (CSS) representation of the object outline by smoothing the object outline, deriving at least one additional parameter reflecting the shape or mass distribution of a smoothed version of the original curve, and associating the CSS representation and the additional parameter as a shape descriptor of the object.

In a method described herein, an additional parameter relates to the smoothed outline corresponding to a peak in the CSS image.

In a method described herein, an additional parameter relates to the smoothed outline corresponding to the highest peak in the CSS image.

In a method described herein, additional parameter corresponds to the eccentricity of the outline.

In a method described herein, an additional parameter corresponds to the circularity of the outline.

In a method described herein, at least one additional parameter uses a region-based representation.

In a method described herein, an additional parameter is a region moment invariant.

In a method described herein, an additional parameter is based on Fourier descriptors.

In a method described herein, an additional parameter is based on Zernike moments of the region enclosed by the outline.

A method of representing a plurality of objects appearing in a still or video image, by processing signals corresponding to the images is described herein. According to an embodiment, the method comprises, for each object outline, determining if there are significant changes in curvature in the object outline, and, if there are significant changes in curvature of the object outline, then deriving a shape descriptor using a method as described herein and, if there are no significant changes in curvature of the object outline, then deriving a shape descriptor including at least said additional parameter reflecting the shape of the object outline.

In a method described herein, the additional parameter for an object outline having no significant changes in curvature is based on region moment invariants, Fourier descriptors or Zernike moments of the outline.

A method of searching for an object in a still or video image by processing signals corresponding to images is described herein. The method comprises inputting a query in the form of a two-dimensional outline, deriving a descriptor of said outline using a method described herein, and comparing said query descriptor with each descriptor for stored objects using a matching procedure using the CSS values and the additional parameters to derive a similarity measure, and selecting and displaying at least one result corresponding to an image containing an object for which the comparison indicates a degree of similarity between the query and said object.

In a method described herein, the similarity measure is based on M where M=a*GP-S+CSS-S where GP-S is the similarity measure between additional parameters of the compared object outlines and CSS-S is the similarity measure between the CSS values for the compared object outlines, and a is a constant.

In a method described herein, a depends on the number and height of the CSS peaks.

In a method described herein, a=1 when there are no CSS peaks associated with either outline and a=0 when at least one outline has a CSS peak.

A method of searching for an object in a still or video image by processing signals corresponding to images is described herein. The method comprises calculating a similarity measure between two object outlines using a CSS representation of said outlines and additional parameters reflecting the shape of or mass distribution within the original outline or a smoothed version of the outline.

An apparatus described herein is adapted to implement a method as described herein.

A computer program described herein implements a method as described herein.

A computer system described herein is programmed to operate according to a method as described herein.

A computer-readable storage medium described herein stores computer-executable process steps for implementing a method described herein.

A method of representing objects in still or video images described herein is described with reference to the accompanying drawings.

A method of searching for objects in still or video images described herein is described with reference to the accompanying drawings.

A computer system described herein is described with reference to the accompanying drawings.

BEST MODE FOR CARRYING OUT THE INVENTION

First Embodiment

Figure 1:
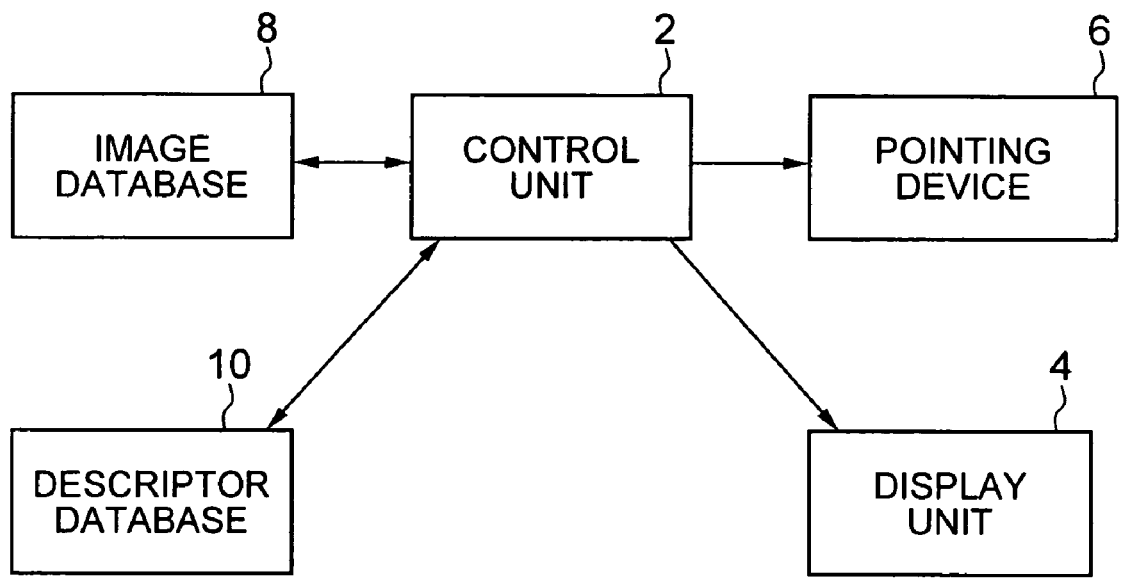
FIG. 1 is a block diagram of a video database system.
Figure 2:
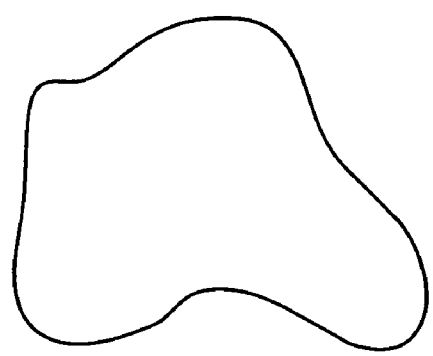
FIG. 2 is a drawing of an outline of an object.
Figure 3:
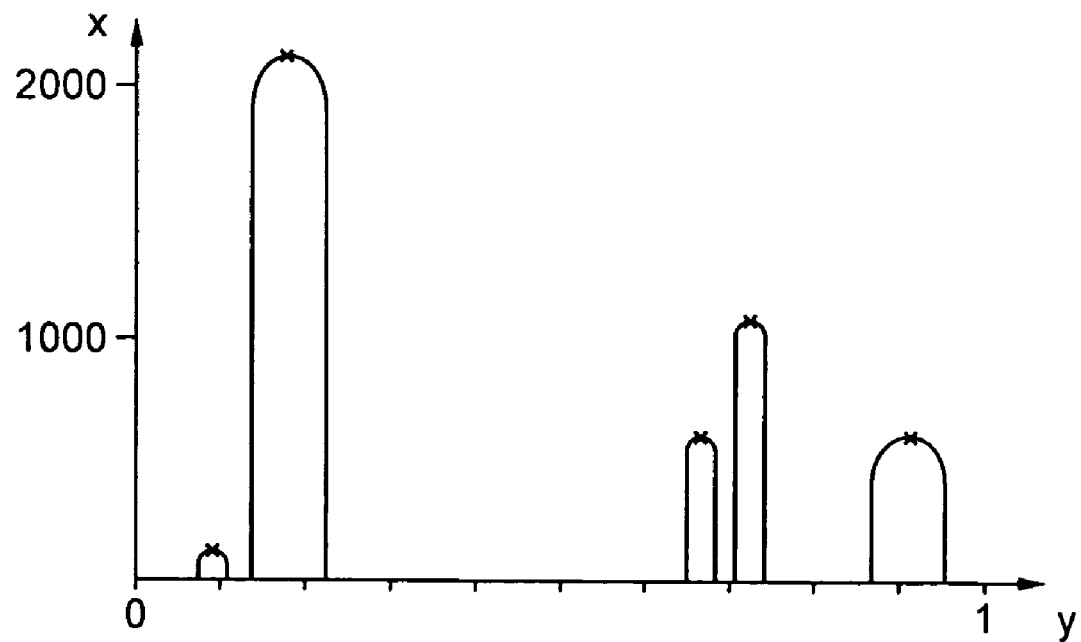
FIG. 3 is a CSS representation of the outline of FIG. 2.

FIG. 1 shows a computerised video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi=\{(x(u), y(u), u\in[0, 1]\}$ where u is a normalised arc length parameter.

The outline is smoothed by convolving $\Psi$ with an 1D Gaussian kernel $g(u, \sigma)$, and the curvature zero crossings of the evolving curve are examined as $\sigma$ changes. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where
$X(u,\sigma)=x(u)*g(u,\sigma)$ $Y(u,\sigma)=y(u)*g(u,\sigma)$
and
$X_u(u,\sigma)=x(u)*g_u(u,\sigma)$ $X_{uu}(u,\sigma)=x(u)*g_{uu}(u,\sigma)$ In the above, * represents convolution and subscripts represent derivatives.

The number of curvature zero crossings changes as $\sigma$ changes, and when $\sigma$ is sufficiently high $\Psi$ is a convex curve with no zero crossings.

The zero crossing points $(u, \sigma)$ are plotted on a graph, known as the CSS image space. This results in a plurality of curves characteristic of the original outline. The peaks of the characteristic curves are identified and the corresponding co-ordinates are extracted and stored. In general terms, this gives a set of n co-ordinate pairs $[(x1,y1), (x2,y2), \ldots (x_n,y_n)]$, where n is the number of peaks, and xi is the arc-length position of the ith peak and yi is the peak height. These peak co-ordinates constitute the CSS representation.

In addition to the CSS representation, further parameters are associated with the shape to produce the shape descriptor. In this embodiment, the additional parameters are the eccentricity and circularity of the "prototype region" for the shape, where the "prototype region" of the shape is the contour of the shape after the final smoothing step, that is, at the point equivalent to the highest peak value $\sigma$. Other values of $\sigma$ can be selected for the prototype region. This results in a shape descriptor for a shape S in the form: {EPR, CPR, PEAKS} where EPR represents the eccentricity of the prototype region, CPR the circularity of the prototype region, and PEAKS the CSS representation.

A method of searching for an object in an image in accordance with an embodiment of the invention will now be described.

Here, the descriptor database 10 of the system of FIG. 1 stores shape descriptors derived according to the method described above.

The user initiates a search by drawing an object outline on the display using the pointing device. The control unit 2 then derives a shape descriptor of the input outline in the manner described above. The control unit then performs a matching comparison with each shape descriptor stored in the database.

Suppose the input outline, Shape S1, is being compared with a stored shape S2, S1 and S2 being respective descriptors:

S1: {EPR1, CPR1, PEAKS1}
S2: {EPR2, CPR2, PEAKS2}

Where EPR means Eccentricity of the prototype region and CPR means Circularity of the prototype region, and PEAKS means the set of coordinates of peaks in the CSS image (the set can be empty). The similarity measure between two shapes is computed as follows.

$$M=a*abs((EPR2-EPR1)/(EPR2+EPR1))+b*abs((CPR2-CPR1)/((CPR2+CPR1))+SM(PEAKS1, PEAKS2)$$

Where a and b are two coefficients and SM is the standard similarity measure defined on the two sets of peaks [1], and abs denotes absolute value. SM is calculated using a known matching algorithm such as described in the above-mentioned papers can be used. That matching procedure is briefly described below.

Given two closed contour shapes, the image curve $\Psi i$ and the model curve $\Psi m$ and their respective sets of peaks {(xi1, yi1), (xi2,yi2), ..., (xin,yin)} and {(xm1,ym1), (xm2,ym2), ..., (xmn,ymn)} the similarity measure is calculated. The similarity measure is defined as a total cost of matching of peaks in the model into peaks in the image. The matching which minimises the total cost is determined using a dynamic programming. The algorithm recursively matches the peaks from the model to the peaks from the image and calculates the cost of each such match. Each model peak can be matched with only one image peak and each image peak can be matched with only one model peak. Some of the model and or image peak may remain unmatched, and there is an additional penalty cost for each unmatched peak. Two peaks can be matched if their horizontal distance is less than 0.2. The cost of a match is the length of the straight line between the two matched peaks. The cost of an unmatched peak is its height.

In more detail the algorithm works by creating and expanding a tree-like structure, where nodes correspond to matched peaks:

1. Create starting node consisting of the largest maximum of the image (xik,yik) and the largest maximum of the model (xir,yir).

2. For each remaining model peak which is within 80 percent of the largest maximum of the image peaks create an additional starting node.

3. Initialise the cost of each starting node created in 1 and 2 to the absolute difference of the y-coordinate of the image and model peaks linked by this node.

4. For each starting node in 3, compute the CSS shift parameter alpha, defined as the difference in the x (horizontal) coordinates of the model and image peaks matched in this starting node. The shift parameter will be different for each node.

5. For each starting node, create a list of model peaks and a list of image peaks. The list hold information which peaks are yet to be matched. For each starting node mark peaks matched in this node as "matched", and all other peaks as "unmatched".

6. Recursively expand a lowest cost node (starting from each node created in steps 1-6 and following with its children nodes) until the condition in point 8 is fulfilled. To expand a node use the following procedure:

7. Expanding a node:

If there is at least one image and one model peak left unmatched:

select the largest scale image curve CSS maximum which is not matched (xip,yip). Apply the starting node shift parameter (computed in step 4) to map the selected maximum to the model CSS image—now the selected peak has coordinates (xip-alpha, yip). Locate the nearest model curve peak which is unmatched (xms,yms). If the horizontal distance between the two peaks is less than 0.2 (i.e: |xip-alpha-xms|0.2), match the two peaks and define the cost of the match as the length of the straight line between the two peaks. Add the cost of the match to the total cost of that node. Remove the matched peaks from the respective lists by marking them as "matched". If the horizontal distance between the two peaks is greater than 0.2, the image peak (xip,yip) cannot be matched. In that case add its height yip to the total cost and remove only the peak (xip,yip) from the image peak list by marking it as "matched".

Otherwise (There are only image peaks or there are only model peaks left unmatched):

Define the cost of the match as the height of the highest unmatched image or model peak and remove that peak from the list.

8. If after expanding a node in 7 there are no unmatched peaks in both the image and model lists, the matching procedure is terminated. The cost of this node is the similarity measure between the image and model curve. Otherwise, go to point 7 and expand the lowest cost node.

The above procedure is repeated with the image curve peaks and the model curve peaks swapped. The final matching value is the lower of the two.

The above steps are repeated for each model in the database.

The similarity measures resulting from the matching comparisons are ordered and the objects corresponding to the descriptors having similarity measures indicating the closest match (i.e. here the lowest similarity measures) are then displayed on the display unit 4 for the user. The number of objects to be displayed can be pre-set or selected by the user.

In an alternative implementation, different parameters can be used to describe the shape of the "prototype region". For example three Fourier coefficients of the curve can be used. The similarity measure can be defined as follows:

$$M=a*EUC(F1,F2)+SM(PEAKS1,PEAKS2)$$

Where EUC is a Euclidean distance between vectors F1 and F2 formed from three main Fourier Coefficients of the model and image shape, a is a constant, and SM represents the similarity measure for the CSS peaks, calculated using a method essentially as described above.

INDUSTRIAL APPLICABILITY

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described may be provided in software or hardware form. Although the invention has been described in the form of a computer system, it could be implemented in other forms, for example using a dedicated chip.

Specific examples have been given of methods of representing a 2D shape of an object and of methods for calculating values representing similarities between two shapes but any suitable such methods can be used.

The invention can also be used, for example, for matching images of objects for verification purposes, or for filtering.

The invention claimed is:

1. A method of representing an object appearing in a still or video image, by processing signals corresponding to the image using one or more processors, the method comprising:
deriving, using a processor, a curvature scale space (CSS) representation of the object outline by smoothing the object outline,
deriving, using a processor, at least one additional parameter reflecting the shape or mass distribution of the smoothed version of the original object outline, and
associating the CSS representation and said at least one additional parameter as a shape descriptor of the object,
wherein said at least one additional parameter corresponds to the eccentricity of said smoothed version of the original object outline.

2. A method as claimed in claim 1 wherein an additional parameter relates to the smoothed outline corresponding to a peak in the CSS image.

3. A method as claimed in claim 2 wherein an additional parameter relates to the smoothed outline corresponding to the highest peak in the CSS image.

4. A method as claimed in claim 1 wherein at least one additional parameter uses a region-based representation.

5. A method as claimed in claim 4 wherein an additional parameter is a region moment invariant.

6. A method as claimed in claim 4 wherein an additional parameter is based on Fourier descriptors.

7. A method as claimed in claim 4 wherein an additional parameter is based on Zernike moments of the region enclosed by the outline.

8. A control device for representing an object appearing in an image by processing signals corresponding to the image, comprising:
a controller for performing the steps of:
deriving a curvature scale space (CSS) representation of an object outline by smoothing the object outline,
deriving at least one additional parameter reflecting a shape or mass distribution of a smoothed version of the original object outline, and
associating the CSS representation and the additional parameter as a shape descriptor of the object,
wherein said at least one additional parameter corresponds to the eccentricity of said smoothed version of the original object outline.

9. An apparatus for deriving a representation of an object in an image comprising a control device as claimed in claim 8 and storage area for storing images and/or representations of images.

10. An apparatus as claimed in claim 9 wherein the storage area is an image database and/or a descriptor database.

11. An apparatus as claimed in claim 9 or claim 10 further comprising a display.

12. A method for representing an object appearing in an image by processing signals corresponding to the image using one or more processors, comprising:
determining, using a processor, a curvature scale space representation for an object outline to generate a plurality of curves representative of said outline; and
determining, using a processor, characteristics associated with said outline including peaks and associated peak coordinates for said plurality of curves and eccentricity of a smoothed version of said outline to generate a shape descriptor for said outline.

13. The method of claim 12, further comprising:
storing said shape descriptor as a description for said object in a memory.

14. The method of claim 12, wherein said determining a curvature scale space representation includes determining zero crossing points for an initial set of curves generated to produce said plurality of curves representative of said outline.

15. A method for identifying an outline of an object by processing signals corresponding to the image using one or more processors, comprising:
identifying an object outline as a shape descriptor and storing said outline in a memory, wherein said identifying includes:
determining, using a processor, a curvature scale space representation for an object outline to generate a plurality of curves representative of said outline; and
determining, using a processor, characteristics associated with said outline including peaks and associated peak coordinates for said plurality of curves and eccentricity of a smoothed version of said outline to generate said shape descriptor for said outline.

16. A method for recovering an outline of an object appearing in an image by processing signals corresponding to the image using one or more processors, comprising:
recovering, using a processor, an object outline from a shape descriptor wherein said shape descriptor is generated by:
determining a curvature scale space representation for an object outline to generate a plurality of curves representative of said outline; and
determining characteristics associated with said outline including peaks and associated peak coordinates for said plurality of curves and eccentricity of a smoothed version of said outline to generate said shape descriptor for said outline.

17. A system for representing an object appearing in an image, comprising:
a controller and a detector for determining a curvature scale space representation for an object outline to generate a plurality of curves representative of said outline;
wherein said controller to determine characteristics associated with said outline including peaks and associated peak coordinates for said plurality of curves and eccentricity of a smoothed version of said outline to generate a shape descriptor for said outline; and
a memory for storing said shape descriptor as a description for said object in a memory.

18. A system for recovering an outline of an object, comprising:
a controller and a detector for recovering an object outline from a shape descriptor, wherein said controller and detector to determine a curvature scale space representation for said object outline to generate a plurality of curves representative of said outline;
wherein said controller to determine characteristics associated with said outline including peaks and associated peak coordinates for said plurality of curves and eccentricity of a smoothed version of said outline to generate said shape descriptor for said outline; and
a memory for storing said shape descriptor as a description for said object in a memory.

19. A computer-readable medium having stored thereon a plurality of executable instructions, the plurality of instructions comprising instructions to:

determine a curvature scale space representation for an object outline to generate a plurality of curves representative of said outline;

determine characteristics associated with said outline including peaks and associated peak coordinates for said plurality of curves and eccentricity of a smoothed version of said outline to generate a shape descriptor for said outline; and store said shape descriptor as a description for said object in a memory.

20. A method of representing a plurality of objects appearing in a still or video image, by processing signals corresponding to the images, the method comprising, for each object outline, determining, using a processor, if there are significant changes in curvature in the object outline, and, if there are significant changes in curvature of the object outline, then deriving a shape descriptor using a processor configured to perform the method of claim 1 and, if there are no significant changes in curvature of the object outline, then deriving, using a processor, a shape descriptor including at least said additional parameter reflecting the shape of the object outline.

21. A method as claimed in claim 20 wherein the additional parameter for an object outline is based on region moment invariants, Fourier descriptors or Zernike moments of the outline.

* * * * *